United States Patent
Raviv et al.

(10) Patent No.: US 10,356,120 B1
(45) Date of Patent: Jul. 16, 2019

(54) METHOD, APPARATUS AND COMPUTER PROGRAM PRODUCT FOR ASSESSING THE RISK OF ELECTRONIC COMMUNICATIONS USING LOGON TYPES

(71) Applicant: EMC IP HOLDING COMPANY LLC, Hopkinton, MA (US)

(72) Inventors: Kineret Raviv, Herzliya (IL); Uri Fleyder, Bat-Yam (IL); Marcelo Blatt, Modin (IL); Ofri Mann, Eilat (IL); Richard Chiles, Castro Valley, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 277 days.

(21) Appl. No.: 15/581,055

(22) Filed: Apr. 28, 2017

(51) Int. Cl.
| H04L 29/06 | (2006.01) |
| G06F 21/31 | (2013.01) |
| H04L 29/08 | (2006.01) |
| G06Q 20/40 | (2012.01) |

(52) U.S. Cl.
CPC .......... H04L 63/1433 (2013.01); G06F 21/31 (2013.01); H04L 63/083 (2013.01); H04L 63/1425 (2013.01); H04L 67/22 (2013.01); G06Q 20/401 (2013.01); G06Q 20/4016 (2013.01)

(58) Field of Classification Search
CPC ..... H04L 63/08; H04L 63/083; H04L 63/105; H04L 63/1425; H04L 63/1441; H04L 67/22; H04L 2463/082; G06Q 20/4016; G06Q 20/401; G06F 21/31
See application file for complete search history.

(56) References Cited

U.S. PATENT DOCUMENTS

| 8,549,595 | B1* | 10/2013 | Vaisman | H04L 63/0876 713/152 |
| 8,646,060 | B1* | 2/2014 | Ben Ayed | H04L 63/0853 726/9 |
| 8,788,419 | B2* | 7/2014 | Samuels | G06F 21/40 705/42 |
| 9,124,570 | B1* | 9/2015 | Asher | H04L 63/08 |
| 9,160,726 | B1* | 10/2015 | Kaufman | H04L 63/08 |
| 9,305,151 | B1* | 4/2016 | Dotan | G06F 21/31 |
| 10,015,153 | B1* | 7/2018 | Dotan | G06F 21/316 |
| 10,015,156 | B2* | 7/2018 | Jones-McFadden | H04L 63/083 |
| 10,147,065 | B1* | 12/2018 | Yiftachel | G06Q 10/0635 |

(Continued)

Primary Examiner — Tae K Kim
(74) Attorney, Agent, or Firm — Krishnendu Gupta

(57) ABSTRACT

Disclosed are techniques for use in assessing the risk of electronic communications using logon types. In one embodiment, the techniques comprise a method. The method comprises receiving an electronic communication relating to a login request involving a user and a provider of a computerized resource. The method comprises determining a logon type associated with the logon request. The method comprises determining a first value relating to an amount of logon requests associated with the logon type involving the user and the provider over a first time period and a second value relating to an amount of logon requests associated with the logon type involving the user and the provider over a second time period that is greater than the first time period. The method comprises generating a risk score describing the risk associated with the logon request based on the first and the second values.

15 Claims, 4 Drawing Sheets

(56) References Cited

U.S. PATENT DOCUMENTS

| | | | |
|---|---|---|---|
| 2010/0094767 A1* | 4/2010 | Miltonberger | G06Q 10/067 705/325 |
| 2012/0180124 A1* | 7/2012 | Dallas | G06F 21/46 726/22 |
| 2012/0284187 A1* | 11/2012 | Hammad | G06Q 20/20 705/44 |
| 2014/0181968 A1* | 6/2014 | Ge | H04L 63/1416 726/23 |
| 2015/0026027 A1* | 1/2015 | Priess | G06Q 40/00 705/35 |
| 2015/0026796 A1* | 1/2015 | Alan | G06F 21/31 726/19 |
| 2015/0324559 A1* | 11/2015 | Boss | H04L 63/20 726/1 |
| 2015/0341335 A1* | 11/2015 | Camenisch | H04L 9/3226 713/156 |
| 2016/0088000 A1* | 3/2016 | Siva Kumar | H04L 63/083 726/23 |
| 2016/0164922 A1* | 6/2016 | Boss | H04L 63/20 726/1 |
| 2017/0083914 A1* | 3/2017 | Baker | G06Q 20/4014 |
| 2017/0091772 A1* | 3/2017 | Piel | G06Q 20/12 |
| 2017/0195307 A1* | 7/2017 | Jones-McFadden | H04L 63/083 |
| 2018/0034859 A1* | 2/2018 | Aronowitz | H04L 63/205 |
| 2018/0054429 A1* | 2/2018 | Donahue | G06F 21/577 |
| 2018/0124082 A1* | 5/2018 | Siadati | G06F 21/552 |
| 2018/0139232 A1* | 5/2018 | Bar Av | H04L 63/10 |
| 2018/0204215 A1* | 7/2018 | Hu | G06Q 20/401 |
| 2018/0205748 A1* | 7/2018 | Gurkok | H04L 63/1416 |

* cited by examiner

| EVENT TIME 301 | USERNAME 302 | PROVIDER 303 | LOGON TYPE 304 |
|---|---|---|---|
| 17-Feb-2017 17:08 | USER 1 | SERVER 1 | 3 |
| 17-Feb-2017 17:11 | USER 1 | SERVER 2 | 2 |
| 17-Feb-2017 18:22 | USER 1 | END DEVICE 1 | 3 |
| 17-Feb-2017 19:22 | USER 2 | SERVER 2 | 3 |

METHOD, APPARATUS AND COMPUTER PROGRAM PRODUCT FOR ASSESSING THE RISK OF ELECTRONIC COMMUNICATIONS USING LOGON TYPES

TECHNICAL FIELD

The present invention relates generally to authentication. More particularly, the present invention relates to a method, an apparatus and a computer program product for assessing the risk of electronic communications using logon types.

BACKGROUND OF THE INVENTION

In parallel to the growth in use of online channels for accessing a variety of services, and performing a variety of transactions, identity theft has reached epidemic levels, and online account takeover and transaction fraud is growing at an enormous rate. Fraudsters have new technologies at their disposal: for example "Trojan horses" and key loggers are installed in unsuspecting customers' computers, transmitting personal information back to the fraudster; and phishing attacks trick consumers into giving up personal and financial information (for example without limitation: social security number ("SSN"), account numbers, banking information, user names and passwords for various services, personal identification number ("PIN"), credit card numbers, which may be referred to as for example "user Credentials" or "Credentials").

Recent scams indeed show a sophisticated, determined, innovative and well organized online crime wave. Fraudsters are more adaptive than ever, modifying their modus operandi and techniques quickly to exploit new vulnerabilities. While the fraudsters do not limit themselves to a specific sector, their main focus is on the banking and financial accounts sectors (other sectors prone to fraud are government services, ISPs, telecom companies and healthcare and many others).

One issue relates to authentication and how does a service or transaction provider indeed know whether a certain user accessing a service and performing actions at a certain site is indeed who he or she claims to be. It is clear that in today's environment using the combination of a logon and password alone (which still are the most prevalent method of authentication) may not be satisfactory.

Many solutions have been proposed for the problem of authentication, however many of them encounter an imbalance between usability and security (i.e., they are either not secure enough, or, when security is enhanced to satisfactory levels, they are cumbersome and expensive to deploy and operate). There is, therefore, a need for further solutions to deal with the problem of authentication.

SUMMARY OF THE INVENTION

There is disclosed a method, comprising: receiving, by processing circuitry, an electronic communication relating to a login request involving a user and a provider of a computerized resource; determining, by processing circuitry, a logon type associated with the logon request; determining, by processing circuitry, a first value relating to an amount of logon requests associated with the logon type involving the user and the provider over a first time period and a second value relating to an amount of logon requests associated with the logon type involving the user and the provider over a second time period that is greater than the first time period; and based on the first and the second values, generating, by processing circuitry, a risk score describing the risk associated with the logon request.

There is also disclosed an apparatus, comprising: memory; and processing circuitry coupled to the memory, the memory storing instructions which, when executed by the processing circuitry, cause the processing circuitry to: receive an electronic communication relating to a login request involving a user and a provider of a computerized resource; determine a logon type associated with the logon request; determine a first value relating to an amount of logon requests associated with the logon type involving the user and the provider over a first time period and a second value relating to an amount of logon requests associated with the logon type involving the user and the provider over a second time period that is greater than the first time period; and based on the first and the second values, generate a risk score describing the risk associated with the logon request.

There is also disclosed a computer program product having a non-transitory computer readable medium which stores a set of instructions, the set of instructions, when carried out by processing circuitry, causing the processing circuitry to perform a method of: receiving an electronic communication relating to a login request involving a user and a provider of a computerized resource; determining a logon type associated with the logon request; determining a first value relating to an amount of logon requests associated with the logon type involving the user and the provider over a first time period and a second value relating to an amount of logon requests associated with the logon type involving the user and the provider over a second time period that is greater than the first time period; and based on the first and the second values, generating a risk score describing the risk associated with the logon request.

BRIEF DESCRIPTION OF THE DRAWINGS

The invention will be more clearly understood from the following description of preferred embodiments thereof, which are given by way of examples only, with reference to the accompanying drawings, in which:

FIG. 3 is a block diagram showing details of a database of the electronic environment of FIG. 1 and utilized by the logon analysis device of FIG. 2

DETAILED DESCRIPTION

Figure 1:
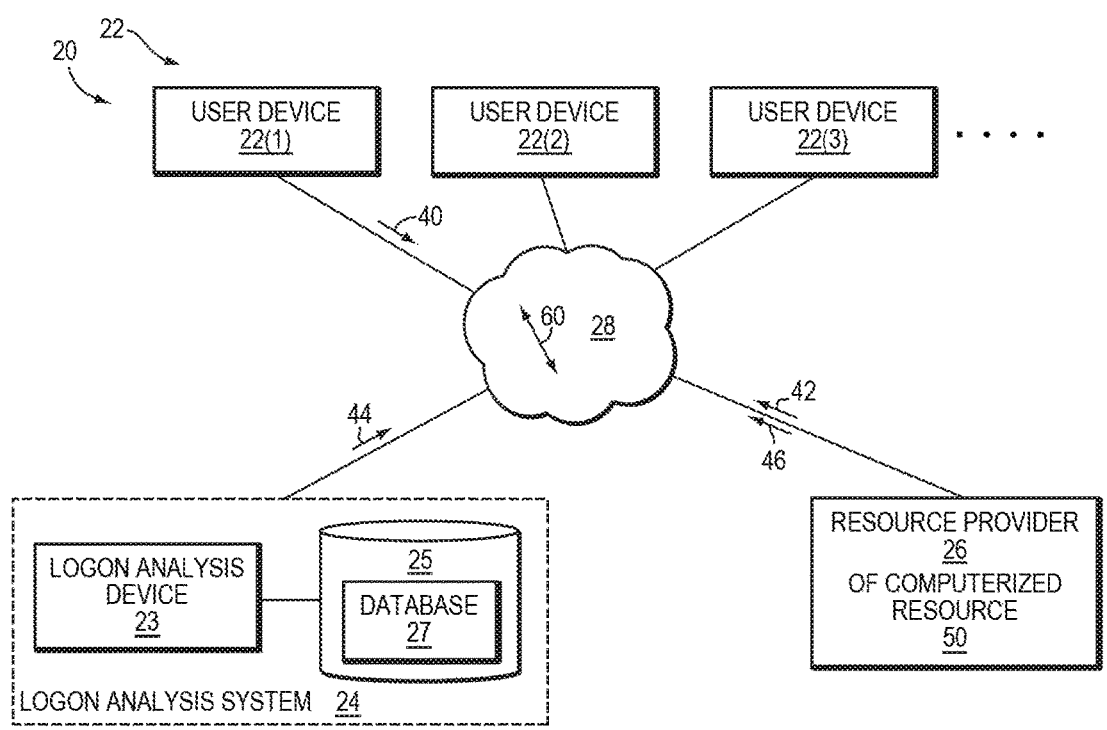
FIG. 1 is a block diagram of an electronic environment showing particular components of the electronic environment.

FIG. 1 shows an electronic environment 20. The electronic environment 20 includes user devices 22(1), 22(2), 22(3), . . . (collectively, user device 22), a logon analysis system 24, a resource provider 26, and communications medium 28.

Each user device 22 is constructed and arranged to perform useful work on behalf of a user. For example, the user device 22(1) may be a general purpose computer, the user device 22(2) may be a tablet, the user device 22(3) may be a smart phone, and so on.

The logon analysis system 24 is constructed and arranged to assess on behalf of the resource provider 26 the risk of electronic communications relating to logon requests using logon types. Logon analysis system 24 includes a logon analysis device 23 and a storage device 25 storing a database 27.

The resource provider 26 provides each user device 22 with access to one or more computerized resources 50 following successful user authentication. An example of a suitable resource provider 26 is a data storage array which provides secure access to files, directories, volumes, LUNs, etc. Another example of a suitable resource provider 26 is a web server which provides secure access to various web pages. Yet another example of a suitable resource provider 26 is a server which provides secure user account and/or transactional access such as that for an online banking site, an online store, an online gaming site, and so on. Other types of resource providers are suitable for use as well.

The communications medium 28 connects the various components of the electronic environment 20 together to enable these components to exchange electronic signals 60 (e.g., see the double arrow 60). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based devices and cabling, fiber optic devices and cabling, wireless devices, combinations thereof, etc.

During operation, the user device 22 attempts to access the computerized resource 50 of the resource provider 26 by sending an electronic communication comprising a logon request 40. The resource provider 26 responds to the request 40 by sending a request transmission 42 through the communications medium 28 to the logon analysis system 24 directing the system 24 to perform an operation to determine the risk of the request 40. The risk of the request 40 will be one of the factors when determining whether to grant access to the computerized resource 50 as will be explained further below.

Upon receiving the request transmission 42, the system 24 determines the logon type associated with the logon request 40. The device 23 which forms part of the system 24 uses the logon type to generate a first value relating to an amount of logon requests associated with the logon type involving the user and the resource provider 26 over a first time period as well a second value relating to an amount of logon requests associated with the logon type involving the user and the resource provider 26 over a second time period that is greater than first time period. For example, the first time period may relate to a day, and the first value may correspond to a ratio of a number of logon requests associated with the logon type involving the user and the resource provider during the day to a total number of logon requests associated with any type of logon type involving the user and the resource provider during the day. The second time period may relate to two or more days and the second value may relate to the average daily ratio during the two or more days.

It should be understood that the daily ratio for each day of the two or more days is determined in a similar manner to that described above with respect to the first value. However, as will be appreciated, the second time period comprises multiple discrete time periods similar in duration to the first time period. For example, the second time period may relate to sixty days such that the second time period comprise sixty discrete time periods similar in duration to the first time period. Thus, and with this in mind, the second value should relate to the discrete time periods in the second time period having login requests associated with any of one or more logon types and involving the user and the provider 26. The discrete time periods with no logon requests or logon requests with a null logon type are not included in the average. The average of daily ratios may therefore not relate to sixty respective ratios or sixty days but less than sixty given that some discrete periods may not comprise logon requests between the user and the resource provider or there may be logon requests with a null logon type.

Here, in this particular embodiment, the database 27 stored in the storage device 25 contains records of previous logon requests involving the user and the resource provider over a period of time. For example, in at least one embodiment, the database 27 may contain details of each logon request including the time, the user/user device 22, the resource provider 26 and the logon type. It should also be understood that the database 27 possess records for a defined period of time (e.g., 60 days) such that the device 23 can determine the first and second values. The defined period of time, however, in at least one embodiment, may be a moving time window that moves with time such that older records are removed as time progresses. This way the database 27 maintains records of previous logon requests relating to the moving time window and any logon request outside that time window is removed from the database 27.

Once the first and second values are determined, the logon analysis device 23 determine a risk score based on the first and the second values that describes the risk associated with the logon request 40. For example, the logon analysis device 23 may determine the risk score by performing a computation involving multiple steps. The steps may include generating a third value corresponding to a ratio of the first value to the second value. The steps may also include generating a fourth value that is the maximum of one and the third value. The steps may further include generating a fifth value corresponding to one minus the fourth value. The steps may further include generating a sixth value corresponding to a mathematical constant e to the power of the fifth value. The steps may still further include generating a seventh value as the risk score that corresponds to one minus the sixth value.

Next, the logon analysis device 23 determines whether to allow access to the computerized resource 50 based on the risk score. For example, the device 23 may compare the risk score to a threshold to assess the riskiness. If the risk score exceeds the threshold, the logon request 40 may be deemed risky. If the risk score does not exceed the threshold, the logon request 40 may be deemed genuine. The device 23 in response to the comparison sends 44 an authentication result to the resource provider 26. The resource provider 26 communicates 46 this result with the user device 22.

Figure 2:
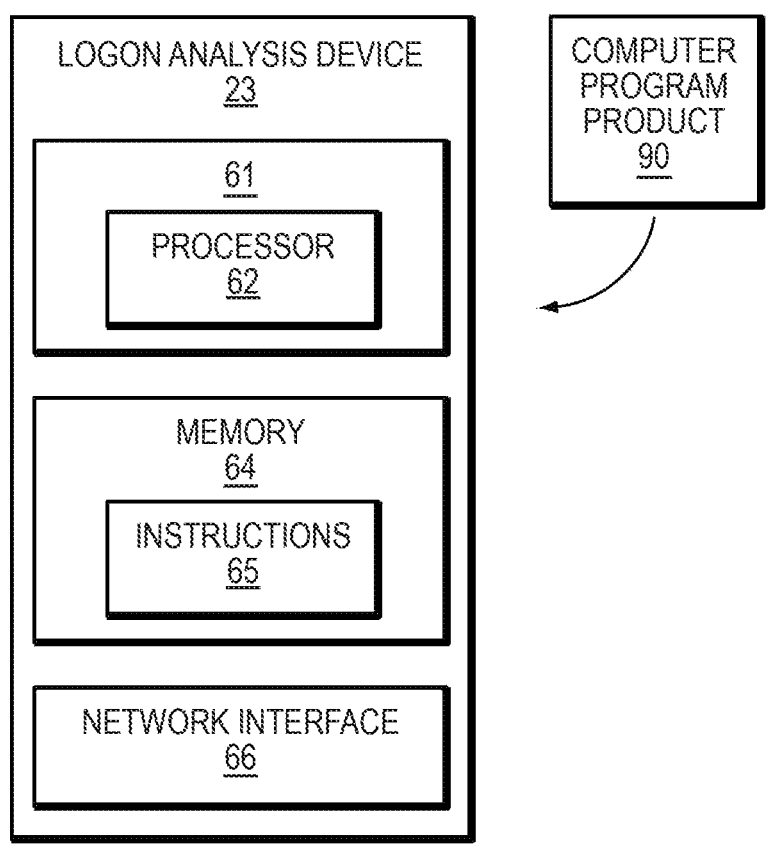
FIG. 2 is a block diagram of a logon analysis device of the electronic environment of FIG. 1.

FIG. 2 illustrates components of the logon analysis device 23 of the logon analysis system 24 including a controller 61 which in turn includes a processor 62, a memory 64 and a network interface 66.

Memory 64 is configured to store code which includes instructions 65 to process a logon request from resource provider 26. Memory 64 is further configured to store data from database 27 and request 42. Memory 64 generally takes the form of, e.g., random access memory, flash memory or a non-volatile memory.

Processor 62 can take the form of, but is not limited to, an Intel or AMD-based MPU, and can be a single or multi-core running single or multiple threads. Processor 62 is coupled to memory 64 and is configured to execute the instructions 65 stored in memory 64.

Network interface 66 is constructed and arranged to send and receive data over communications medium 28. Specifically, network interface 66 is configured to receive request 42 from and to send authentication result 44 to the resource provider 26.

In some arrangements, the logon analysis device 23 is implemented by a set of processors or other types of processing circuitry running software. In such arrangements, the software instructions can be delivered to the logon analysis device 23 in the form of a computer program product 90 having a non-transitory computer readable storage medium which stores the instructions in a non-volatile manner. Alternative examples of suitable computer readable storage media include tangible articles of manufacture and apparatus such as CD-ROM, flash memory, disk memory, tape memory, and the like.

FIG. 3 is a block diagram showing details of the database 27 utilized by the logon analysis device 23 of FIG. 2. The table 300 describes logon requests between users and providers of computerized resources. The table 300 as illustrated comprising a first column describing a logon event time 301, a second column describing a user name 302 (e.g., users/user devices 22), a provider name 303 (e.g., resource providers 26, etc.) and logon type 304.

In this particular example, the logon requests are received at various times on Feb. 17, 2017 and include communications between User 1 and Server 1, User 1 and Server 2 as well as User 1 and End Device 1. Also, the logon requests include a communication between User 2 and Server 2. The respective logon requests, in this particular embodiment, relate to either logon type 2 and 3. It should be further appreciated that the logon types may indicate a type of logon request. For example, the logon types may comprise any of the following:

Logon type 2: Interactive. A user logged on to this computer.
Logon type 3: Network. A user or computer logged on to this computer from the network.
Logon type 4: Batch. Batch logon type is used by batch servers, where processes may be executing on behalf of a user without their direct intervention.
Logon type 5: Service. A service was started by the Service Control Manager.
Logon type 7: Unlock. Unattended workstation with password protected screen saver
Logon type 10: Remote Interactive. Terminal Services, Remote Desktop or Remote Assistance)

Figure 4:
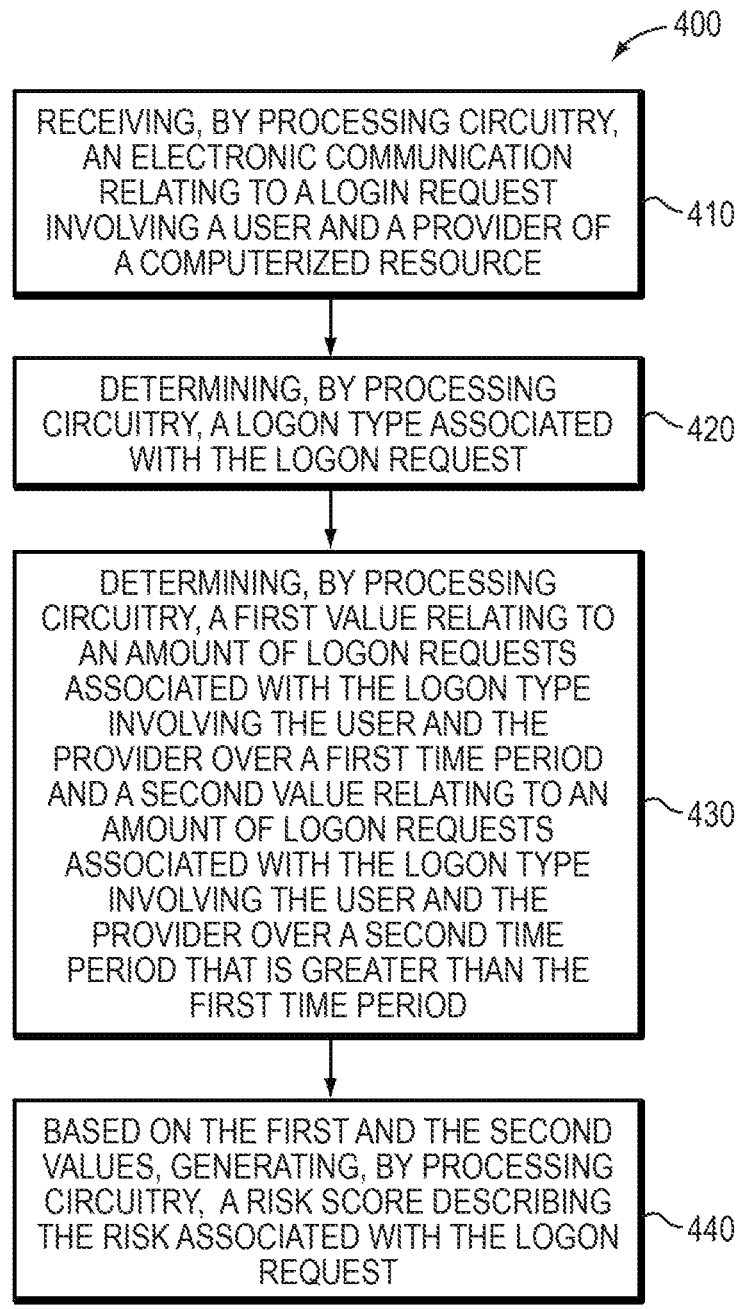
FIG. 4 is a flowchart of a procedure which is performed by the logon analysis device of FIG. 2.

FIG. 4 shows a flow chart which illustrates a method 400, carried out by processor 62, of assessing the risk of an electronic communication using logon types. At step 410, an electronic communication is received relating to a login request involving a user and a provider of a computerized resource. At step 420, a logon type associated with the logon request is determined. At step 430, a first value is determined relating to an amount of logon requests associated with the logon type involving the user and the provider over a first time period. A second value is also determined relating to an amount of logon requests associated with the logon type involving the user and the provider over a second time period that is greater than the first time period. At step 440, a risk score describing the risk associated with the logon request is generated based on the first and the second values.

In use, the above method 400 includes multiple steps. For example, in one exemplary non-limiting embodiment of the method 400, one or more of the steps as performed may involve data extraction, profiling and/or scoring as described below.

1. Data extraction: Using logs that indicate all the logon requests of users to servers, personal devices, etc.
2. Profiling: Per user, count the percentage of each logon_type logon request to each server or end-device, per day, over a period of time (e.g., 60 days). If there are no logon requests for a {username, server/end-device} pair in a specific day, or all the events have logon_type=Null, ignore this day. For days with logon requests of a {username, server/end-device} pair with at least one event with logon_type≠Null, logon_types that do not have events will have count of zero. The daily percentage is the number of daily events with a specific logon_type divided by the number of daily events with logon_type≠Null.
3. Scoring: The score of a user should reflect the anomalousness of the user's logon type with the servers and devices (successful or unsuccessful) on this day. Calculate logon_type_pcnt_avg, the average of the daily percentage per {username, server/end-device, logon_type} triple. The average is calculated over all days with at least one event with not-Null logon_type for this {username, server/end-device} pair. Per event, calculate logon_type_pcnt_last_24 h, the percentage of logon requests for the triple {username, server/end-device, logon_type} over the last 24 hours: number of events in the last 24 hours with a specific logon_type divided by the number of daily events with logon_type≠Null in the last 24 hours. The risk score will, therefore, reflect if the logon type the user communicated with today is rare compared to the average per day. For example, the score may be calculated as follows:

$$\text{user\_rare\_logon\_type}_{score} = 1 - e^{\left(1 - max\left(\frac{logon\_type\_pcnt\_last\_24h}{logon\_type\_pcnt\_avg}, 1\right)\right)}$$

It should be understood that the term "user," as used herein, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, information described as being associated with a user may, for example, be associated with the device 22, a person utilizing or otherwise associated with the device, or a combination of both the person and the device.

While various embodiments of the present disclosure have been particularly shown and described, it will be understood by those skilled in the art that various changes in form and details may be made therein without departing from the spirit and scope of the present disclosure as defined by the appended claims.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method, comprising:
    receiving, by processing circuitry, an electronic communication relating to a login request involving a user and a provider of a computerized resource;
    determining, by processing circuitry, a logon type associated with the logon request;
    determining, by processing circuitry, a first value relating to an amount of logon requests associated with the logon type involving the user and the provider over a first time period and a second value relating to an amount of logon requests associated with the logon type involving the user and the provider over a second time period that is greater than the first time period; and
    based on the first and the second values, generating, by processing circuitry, a risk score describing the risk associated with the logon request; and
    wherein the second time period comprises multiple discrete time periods similar in duration to the first time period; and
    wherein the first value corresponds to a ratio of a number of logon requests associated with the logon type involving the user and the provider during the first time period to a total number of logon requests associated with any logon type involving the user and the provider during the first time period; and
    wherein the second value relates to multiple respective ratios and each ratio relates to a number of logon requests associated with the logon type involving the user and the provider in a discrete time period to a total number of logon requests associated with any logon type involving the user and the provider in the discrete time period, the second value corresponding to an average of the respective ratios; and
    wherein generating, based on the first and the second values, the risk score describing the risk associated with the logon request, comprises:
        generating a third value corresponding to a ratio of the first value to the second value;
        generating a fourth value that is the maximum of one and the third value;
        generating a fifth value corresponding to one minus the fourth value;
        generating a sixth value corresponding to a mathematical constant e to the power of the fifth value; and
        generating a seventh value that corresponds to one minus the sixth value.

2. The method as claimed in claim 1, wherein the second value relates to the discrete time periods in the second time period having login requests associated with any of one or more logon types and involving the user and the provider such that the discrete time periods with no logon requests or logon requests with a null logon type are not included in the average.

3. The method as claimed in claim 1, wherein the first value relates to the ratio over a day and the second value relates to an average daily ratio over two or more days.

4. The method as claimed in claim 1, wherein the second time period relates to a moving time window comprising a defined time period that moves with time.

5. The method as claimed in claim 1, wherein the logon type relates to any one of an interactive logon, a network logon, a batch logon, a service logon, an unlock logon and a remote interactive logon.

6. An apparatus, comprising:
    memory; and
    processing circuitry coupled to the memory, the memory storing instructions which, when executed by the processing circuitry, cause the processing circuitry to:
    receive an electronic communication relating to a login request involving a user and a provider of a computerized resource;
    determine a logon type associated with the logon request;
    determine a first value relating to an amount of logon requests associated with the logon type involving the user and the provider over a first time period and a second value relating to an amount of logon requests associated with the logon type involving the user and the provider over a second time period that is greater than the first time period; and
    based on the first and the second values, generate a risk score describing the risk associated with the logon request; and
    wherein the second time period comprises multiple discrete time periods similar in duration to the first time period; and
    wherein the first value corresponds to a ratio of a number of logon requests associated with the logon type involving the user and the provider during the first time period to a total number of logon requests associated with any logon type involving the user and the provider during the first time period; and
    wherein the second value relates to multiple respective ratios and each ratio relates to a number of logon requests associated with the logon type involving the user and the provider in a discrete time period to a total number of logon requests associated with any logon type involving the user and the provider in the discrete time period, the second value corresponding to an average of the respective ratios; and
    wherein generating, based on the first and the second values, the risk score describing the risk associated with the logon request, comprises:
        generating a third value corresponding to a ratio of the first value to the second value;
        generating a fourth value that is the maximum of one and the third value;
        generating a fifth value corresponding to one minus the fourth value;
        generating a sixth value corresponding to a mathematical constant e to the power of the fifth value; and
        generating a seventh value that corresponds to one minus the sixth value.

7. The apparatus as claimed in claim 6, wherein the second value relates to the discrete time periods in the second time period having login requests associated with any of one or more logon types and involving the user and the provider such that the discrete time periods with no logon requests or logon requests with a null logon type are not included in the average.

8. The apparatus as claimed in claim 6, wherein the first value relates to the ratio over a day and the second value relates to an average daily ratio over two or more days.

9. The apparatus as claimed in claim 6, wherein the second time period relates to a moving time window comprising a defined time period that moves with time.

10. The apparatus as claimed in claim 6, wherein the logon type relates to any one of an interactive logon, a network logon, a batch logon, a service logon, an unlock logon and a remote interactive logon.

11. A computer program product having a non-transitory computer readable medium which stores a set of instructions, the set of instructions, when carried out by processing circuitry, causing the processing circuitry to perform a method of:
   receiving an electronic communication relating to a login request involving a user and a provider of a computerized resource;
   determining a logon type associated with the logon request;
   determining a first value relating to an amount of logon requests associated with the logon type involving the user and the provider over a first time period and a second value relating to an amount of logon requests associated with the logon type involving the user and the provider over a second time period that is greater than the first time period; and
   based on the first and the second values, generating a risk score describing the risk associated with the logon request; and
   wherein the second time period comprises multiple discrete time periods similar in duration to the first time period; and
   wherein the first value corresponds to a ratio of a number of logon requests associated with the logon type involving the user and the provider during the first time period to a total number of logon requests associated with any logon type involving the user and the provider during the first time period; and
   wherein the second value relates to multiple respective ratios and each ratio relates to a number of logon requests associated with the logon type involving the user and the provider in a discrete time period to a total number of logon requests associated with any logon type involving the user and the provider in the discrete time period, the second value corresponding to an average of the respective ratios; and
   wherein generating, based on the first and the second values, the risk score describing the risk associated with the logon request, comprises:
      generating a third value corresponding to a ratio of the first value to the second value;
      generating a fourth value that is the maximum of one and the third value;
      generating a fifth value corresponding to one minus the fourth value;
      generating a sixth value corresponding to a mathematical constant e to the power of the fifth value; and
      generating a seventh value that corresponds to one minus the sixth value.

12. The computer program product as claimed in claim 11, wherein the second value relates to the discrete time periods in the second time period having login requests associated with any of one or more logon types and involving the user and the provider such that the discrete time periods with no logon requests or logon requests with a null logon type are not included in the average.

13. The computer program product as claimed in claim 11, wherein the first value relates to the ratio over a day and the second value relates to an average daily ratio over two or more days.

14. The computer program product as claimed in claim 11, wherein the second time period relates to a moving time window comprising a defined time period that moves with time.

15. The computer program product as claimed in claim 11, wherein the logon type relates to any one of an interactive logon, a network logon, a batch logon, a service logon, an unlock logon and a remote interactive logon.

* * * * *